United States Patent
Seo et al.

(10) Patent No.: US 10,180,236 B2
(45) Date of Patent: Jan. 15, 2019

(54) COLOR CONVERSION FILM AND METHOD FOR PREPARING THE SAME

(71) Applicant: LG CHEM, LTD., Seoul (KR)

(72) Inventors: Joo Yeon Seo, Daejeon (KR); Byeong In Ahn, Daejeon (KR); Dong Mok Shin, Daejeon (KR); Nari Kim, Daejeon (KR); Seijung Park, Daejeon (KR); Taesung Park, Daejeon (KR); Ji Ho Kim, Daejeon (KR); Hye Mi Oh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/368,256

(22) Filed: Dec. 2, 2016

(65) Prior Publication Data

US 2017/0159910 A1 Jun. 8, 2017

(30) Foreign Application Priority Data

Dec. 7, 2015 (KR) .......................... 10-2015-0173498

(51) Int. Cl.
| | |
|---|---|
| *G02B 1/14* | (2015.01) |
| *F21V 9/16* | (2006.01) |
| *F21V 9/30* | (2018.01) |
| *F21V 8/00* | (2006.01) |
| *G02F 1/1335* | (2006.01) |

(52) U.S. Cl.
CPC .................. *F21V 9/30* (2018.02); *G02B 1/14* (2015.01); *G02B 6/0001* (2013.01); *G02F 1/133615* (2013.01); *G02F 2001/133614* (2013.01)

(58) Field of Classification Search
CPC ........... F21V 9/30; G02B 1/14; G02B 6/0001; G02F 1/133615
USPC ........ 362/612; 340/815.45, 815.56; 313/483, 313/500, 501, 506
See application file for complete search history.

(56) References Cited

U.S. PATENT DOCUMENTS

| | | | | |
|---|---|---|---|---|
| 9,182,631 | B2 * | 11/2015 | Iwata ................... | H01L 51/5268 |
| 2009/0052195 | A1 * | 2/2009 | Saneto ................. | G02B 5/0242 |
| | | | | 362/355 |
| 2011/0221741 | A1 * | 9/2011 | Kawamura ........... | H01L 27/322 |
| | | | | 345/214 |
| 2012/0156436 | A1 * | 6/2012 | Kim ...................... | C09K 11/565 |
| | | | | 428/172 |
| 2013/0056717 | A1 * | 3/2013 | Ishihara .............. | H01L 51/5265 |
| | | | | 257/40 |
| 2013/0295337 | A1 * | 11/2013 | Busman ................ | G02F 1/1303 |
| | | | | 428/174 |
| 2013/0331474 | A1 * | 12/2013 | Kida ....................... | C08K 3/22 |
| | | | | 522/39 |

(Continued)

FOREIGN PATENT DOCUMENTS

WO    WO2015033654    *    3/2015

*Primary Examiner* — Thao T Tran
(74) *Attorney, Agent, or Firm* — Dentons US LLP

(57) ABSTRACT

The invention described in the present specification relates to a color conversion film including: a substrate; a color conversion layer provided on the substrate; and a pressure-sensitive adhesive or adhesive layer provided on the color conversion layer, in which the color conversion layer includes an organic fluorescent material dispersed therein and the pressure-sensitive adhesive or adhesive layer includes light diffusion particles dispersed therein, a backlight unit including the same, and a display device including the same.

7 Claims, 2 Drawing Sheets

(56) References Cited

U.S. PATENT DOCUMENTS

2015/0378217 A1* 12/2015 Kim ................. G02F 1/133617
                                                    349/71
2016/0054484 A1*  2/2016 Kikuchi .............. G02B 5/0278
                                                    362/330
2016/0215182 A1*  7/2016 Takahashi ................ C08F 2/22

* cited by examiner

COLOR CONVERSION FILM AND METHOD FOR PREPARING THE SAME

CROSS-REFERENCE TO RELATED APPLICATIONS

This application claims priority to and the benefit of Korean Patent Application No. 10-2015-0173498 filed in the Korean Intellectual Property Office on Dec. 7, 2015, the entire contents of which are incorporated herein by reference.

TECHNICAL FIELD

The present application relates to a color conversion film and a method for preparing the same.

BACKGROUND ART

Since a liquid crystal itself is a non-self-luminous material in an LCD-TV, the LCD-TV needs a separate light source device called a backlight unit (BLU) on the back surface of a front panel in order to enhance the luminance of a display screen. A line light source emitting from the backlight unit is reflected by a reflecting film, passes through a diffuser, is diffused over the entire surface by a light diffusion film, is converted into a surface light source, and thus illuminates a display screen of a TFT-LCD.

In this case, in order to reduce the processes and further enhance the brightness, methods of enhancing the brightness of a display screen by replacing a light diffusion film have been developed. Representative examples thereof include methods of preparing a film by dispersing a light diffusion particle such as metal oxides in a light emitting layer resin and performing the coating/drying processes.

However, since a metal oxide acts as a photo catalyst under specific conditions in an organic fluorescent film using an organic material, optical characteristics of the organic fluorescent material may be reduced. Therefore, it is difficult to directly apply a metal oxide for light diffusion in a composition or film including an organic fluorescent material.

SUMMARY OF THE INVENTION

The present application has been made in an effort to provide a color conversion film including a light diffusion particle, such as a metal oxide, which is difficult to be applied together with an organic fluorescent material, and a backlight unit including the color conversion film.

An exemplary embodiment of the present application provides a color conversion film including: a substrate; a color conversion layer provided on the substrate; and a pressure-sensitive adhesive or adhesive layer provided on the color conversion layer, in which the color conversion layer includes an organic fluorescent material dispersed therein and the pressure-sensitive adhesive or adhesive layer includes light diffusion particles dispersed therein.

Another exemplary embodiment of the present application provides a backlight unit including the color conversion film.

Still another exemplary embodiment of the present application provides a display device including the backlight unit.

According to exemplary embodiments described in the present specification, it is also possible to secure the durability because a light diffusion particle such as a metal oxide does not directly affect an organic fluorescent material while enhancing the brightness of the existing color conversion layer by dispersing a light diffusion particle in a pressure-sensitive adhesive or adhesive layer attached to the color conversion layer, instead of directly dispersing the light diffusion particle such as the metal oxide to the color conversion layer including the organic fluorescent material.

DETAILED DESCRIPTION

Figure 1:
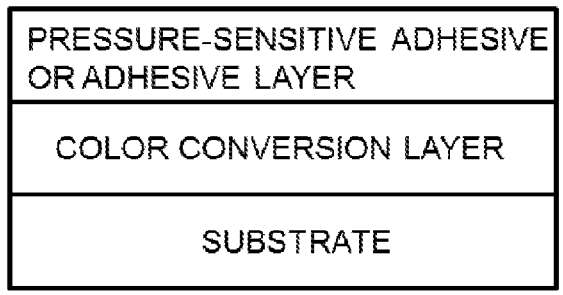
FIGS. 1 and 2 illustrate a stacking structure of a color conversion film according to exemplary embodiments of the present application.

A color conversion film according to an exemplary embodiment of the present application includes: a substrate; a color conversion layer provided on the substrate; and a pressure-sensitive adhesive or adhesive layer provided on the color conversion layer, in which the color conversion layer includes an organic fluorescent material dispersed therein and the pressure-sensitive adhesive or adhesive layer includes light diffusion particles dispersed therein. FIG. 1 illustrates a stacking structure of a color conversion film according to an exemplary embodiment of the present application.

In the present specification, the pressure-sensitive adhesive or adhesive layer includes a light diffusion particle. The present invention may enhance the durability because an organic fluorescent material is not directly affected while enhancing the brightness of light converted by a color conversion layer by including a light diffusion particle in a pressure-sensitive adhesive or adhesive layer instead of the color conversion layer.

As the light diffusion particle, a particle having a higher refractive index than that of a material constituting a pressure-sensitive adhesive or adhesive layer may be used, and for example, a metal oxide particle may be used. As a specific example, $TiO_2$, $SiO_2$, $Al_2O_3$, hollow $SiO_2ZrO_2$, $CeO_2$, and the like may be applied, and one or two or more may be used, but the specific example is not limited thereto.

The light diffusion particles have a particle diameter of preferably 50 nm (0.05 μm) to 5 μm based on D50 of the primary particle. The shape of the light diffusion particle is preferably a spherical shape, but a cocoon shape or an aggregated shape may be used. The content of the light diffusion particle may be determined, if necessary, and may be, for example, within a range of about 1 to 30 parts by weight based on the total 100 parts by weight of the pressure-sensitive adhesive or adhesive layer.

In the present specification, as a component constituting the pressure-sensitive adhesive or adhesive layer, a pressure-sensitive adhesive or adhesive component known in the art may be used. For example, a cation polymerizable pressure-sensitive adhesive or adhesive component, a radical curable pressure-sensitive adhesive or adhesive component, or a mixture thereof may be used.

According to an example, the pressure-sensitive adhesive or adhesive layer includes a cation polymerizable pressure-sensitive adhesive or adhesive component.

The cation polymerizable pressure-sensitive adhesive or adhesive component includes a pressure-sensitive adhesive or adhesive component cured by a cationic polymerization reaction, and may be formed by a cation polymerizable composition known in the art.

The cation polymerizable composition includes a cationic photopolymerization initiator. The cationic photopolymerization initiator is a compound which produces a cation species or a Lewis acid by irradiation of an actinic energy ray, and examples thereof include an onium salt such as an aromatic diazonium salt, an aromatic iodine aluminum salt or an aromatic sulfonium salt, an iron-arene complex, and the like, but are not limited thereto.

The component other than the cationic photopolymerization initiator is not particularly limited as long as the component is used as a cation polymerizable composition in the art. For example, in the cation polymerizable composition, a cation polymerizable monomer such as an epoxy compound and if necessary, a binder resin, a reactive resin, an additive, and the like may be additionally used. For example, the cationic composition includes: (1) 5 to 90 parts by weight of a cation polymerizable compound, for example, an epoxy compound; and (2) 0.5 to 20 parts by weight of a cationic polymerization initiator based on 100 parts by weight of the composition, and may further include (3) an additive for maintaining the viscosity or enhancing the wetting property, if necessary.

According to an exemplary embodiment, the cation polymerizable composition may include a resin, a cationic photo initiator, and a tackifier. As the resin, a rubber-based resin may be used. The content of the cationic photopolymerization initiator may be determined, if necessary, and the cationic photopolymerization initiator may be included in an amount of, for example, 30 to 100 parts by weight based on 100 parts by weight of the resin. The tackifier may be included in an amount of 30 to 40 parts by weight based on 100 parts by weight of the resin. If necessary, an additive known in the art may be further added.

A layer including the cation polymerizable pressure-sensitive adhesive or adhesive component as described above may be formed by applying the above-described cation polymerizable composition on a color conversion layer, and then performing a cationic polymerization. If necessary, a method of attaching a cation polymerizable pressure-sensitive adhesive or adhesive sheet, which is subjected to cationic polymerization, to a color conversion layer may also be used.

According to an exemplary embodiment, it is preferred that the cationic polymerizable pressure-sensitive adhesive or adhesive component does not include a material which additionally generates radical during UV irradiation.

According to another example, the pressure-sensitive adhesive or adhesive layer includes a radical curable pressure-sensitive adhesive or adhesive component. The radical curable pressure-sensitive adhesive or adhesive component includes a pressure-sensitive adhesive or adhesive component cured by a radical curing, and may be formed by a radical curable composition known in the art. The radical curable composition includes a radical polymerizable compound cured through a radical polymerization reaction and/or a component required for a radical polymerization reaction, for example, a radical initiator, and may further include a rubber-based adhesive resin, and the like, if necessary. The composition may also include a solvent, if necessary, but when a composition including a radical polymerizable compound and a radical initiator is in a solution state, a separate solvent may not be used.

The radical polymerizable compound is a compound polymerized by a radical polymerization reaction, and a radical polymerizable monomer or polymer may be used. As the radical polymerizable compound, it is possible to use a polyisocyanate having two or more isocyanate groups in the molecule, a urethane acrylate obtained by reacting hydroxyalkyl (meth)acrylate, (meth)acrylates having one or more (meth)acryloyl groups in the molecule, (meth)acrylamides, maleimides, (meth)acrylic acid, maleic acid, itaconic acid, (meth)acrylaldehyde, (meth)acryloylmorpholine, N-vinyl-2-pyrrolidone or triallyl isocyanurate, and the like.

The radical initiator may be used in order to promote the polymerization of the radical polymerizable compound and enhance the curing rate. Examples of the radical initiator include an acetophenone-based photopolymerization initiator, a benzoin ether-based photopolymerization initiator, a benzophenone-based photopolymerization initiator, a thioxanthone-based photopolymerization initiator, and the like, but are not limited thereto. The radical curable composition may further include an additional additive, if necessary. Examples of the additive include an antioxidant, an oligomer, an adhesion promoter, and the like, but are not limited thereto.

For example, based on 100 parts by weight of the radical polymerizable composition, the content of the radical polymerizable compound may be 80 to 99.5 parts by weight, and the radical initiator may be included in an amount of 0.5 parts by weight to 20 parts by weight.

In order to prevent a radical, which is generated while the radical curable composition is cured, from affecting an organic fluorescent material, it is possible to use a compound having a weight average molecular weight of 300 or more as a radical polymerizable compound in the radical curable composition or to use a method of applying a sheet type, which is formed by separately curing the radical curable composition, to a color conversion layer, without applying the radical curable composition to a color conversion layer.

The radical polymerizable compound having the weight average molecular weight of 300 or more may also be a monomer, a polymer, or a mixture thereof. Specifically, since the radical polymerizable monomer or polymer having a weight average molecular weight of 300 or more has a relatively large molecular weight, the monomer or polymer is difficult to diffuse or permeate in a resin matrix including an organic fluorescent material, and even when a radical is produced thereby after UV curing, the monomer or polymer fails to be reacted with the organic fluorescent material, and thus may not degrade optical characteristics of the color conversion film. Here, a portion in which the weight average molecular weight is 300 or more is a radical polymerizable compound. For the other components which do not affect physical properties of the organic fluorescent material, the weight average molecular weight (MW) is not limited.

When a sheet-type radical curable pressure-sensitive adhesive sheet, which is already cured before being attached to a color conversion layer, is attached to the color conversion layer, it is possible to prevent optical characteristics of the organic fluorescent material during UV curing from deteriorating. A pressure-sensitive adhesive sheet according to an example may be a pressure-sensitive adhesive sheet in a solid state, which is formed by subjecting an adhesive including a rubber-based adhesive resin and a radical initiator to curing process.

For example, the pressure-sensitive adhesive sheet has a gel content of 50% or more. A pressure-sensitive adhesive sheet having a gel content of 50% or more may be formed by curing an adhesive having a gel content of less than 30%, which includes a radical curable pressure-sensitive adhesive or adhesive component.

According to an exemplary embodiment, a storage modulus of the pressure-sensitive adhesive sheet, which is measured at normal temperature, is $6.0 \times 10^5$ dyne/cm$^2$ or more. The thickness of the pressure-sensitive adhesive sheet may be determined, if necessary, and the pressure-sensitive adhesive sheet may be variously prepared so as to have a thicknesses of 10 μm to 50 μm.

In the present specification, the color conversion layer may include a resin matrix and an organic fluorescent material dispersed in the resin matrix.

In the present specification, an organic material emitting light with a peak wavelength different from that of a light absorbed may be used as the organic fluorescent material. For example, the organic fluorescent material may emit light during irradiation of light including a wavelength of 450 nm, or having a light emission peak at 450 nm, a full width at half maximum of 40 nm or less, and a monomodal light emission strength distribution. Here, the light emitted from an organic fluorescent material may be a green light having a light emission peak selected from a wavelength of 500 nm to 560 nm, or a red light having a light emission peak selected from a wavelength of 600 nm to 780 nm, or a mixture thereof.

Figure 2:
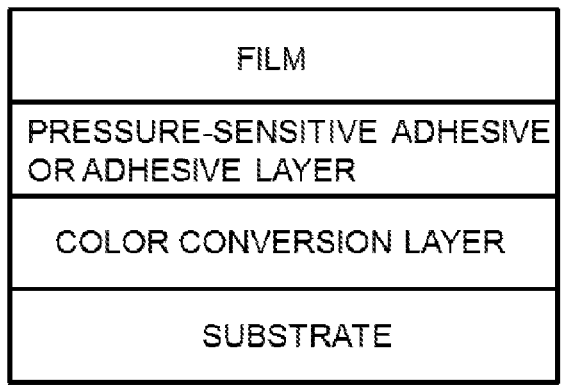

According to an additional exemplary embodiment, an additional film as illustrated in FIG. 2 may be attached to a side of the pressure-sensitive adhesive or adhesive layer of the color conversion film according to exemplary embodiments described in the present specification. As the film, a typical resin film may be used, and a film, which may improve curl characteristics of a color conversion film, is preferred. A protective film or a barrier film may also be used, if necessary. Further, a release film, which temporarily protects the pressure-sensitive adhesive or adhesive layer, may also be used, such that the color conversion film may be attached to another film later. As the resin film, the protective film, the barrier film, and the release film, those known in the art may be used. For example, a polyethylene terephthalate (PET) film may also be used.

According to an exemplary embodiment, for the color conversion film, the light emission wavelength has a full width at half maximum of 60 nm or less during irradiation of light. The full width at half maximum means a width of a light emission peak when light emitted from the film has a height which is half the maximum height at the maximum light emission peak of the light. The light emission peak's full width at half maximum in the present specification may be measured in a film state. Light irradiated on a film when the full width at half maximum is formed may be a light including a wavelength of 450 nm, or having a light emission peak at 450 nm, a full width at half maximum of 40 nm or less, and a monomodal light emission strength distribution. The light emission peak's full width at half maximum may be determined by the type or composition of components such as an organic fluorescent material, a resin matrix, or other additives to be included in the color conversion film. The smaller full width at half maximum the light emission peak of the color conversion film has, the more advantageous it is to enhance the color gamut.

According to an exemplary embodiment of the present application, the organic fluorescent material may include an organic fluorescent material which absorbs a blue or green light to emit a red light, an organic fluorescent material which absorbs a blue light to emit a green light, or a mixture thereof.

In the present specification, for the blue light, the green light, and the red light, the definitions known in the art may be used, and for example, the blue light is a light having a wavelength selected from a wavelength of 400 nm to 500 nm, the green light is a light having a wavelength selected from a wavelength of 500 nm to 560 nm, and the red light is a light having a wavelength selected from a wavelength of 600 nm to 780 nm. In the present specification, a green fluorescent substance absorbs at least a part of a blue light to emit a green light, and a red fluorescent substance absorbs at least a part of a blue light or a green light to emit a red light. For example, the red fluorescent substance may also absorb not only a blue light but also a light with a wavelength of 500 nm to 600 nm.

According to an exemplary embodiment of the present application, as the organic fluorescent material, organic fluorescent materials known in the art may be used, and for example, an organic fluorescent material including a pyrromethene metal complex structure may be used, but the organic fluorescent material is not limited thereto.

According to an example, as the organic fluorescent material, an organic fluorescent material of the following Chemical Formula 1 may be used.

[Chemical Formula 1]

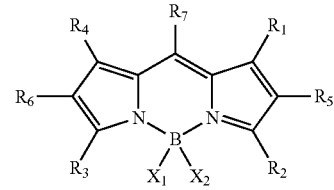

In Chemical Formula 1, $X_1$ and $X_2$ are a fluorine group or an alkoxy group, $R_1$ to $R_4$ are the same as or different from each other, and are each independently hydrogen; a halogen group; an alkyl group; an alkoxy group; a carboxyl group-substituted alkyl group; an aryl group unsubstituted or substituted with an alkoxy group; —COOR; or a —COOR-substituted alkyl group, and herein, R is an alkyl group, $R_5$ and $R_6$ are the same as or different from each other, and are each independently hydrogen; a cyano group; a nitro group; an alkyl group; a carboxyl group-substituted alkyl group; —SO$_3$Na; or an aryl group unsubstituted or substituted with an arylalkynyl group, or $R_1$ and $R_5$ may be linked to each other to form a substituted or unsubstituted hydrocarbon ring or a substituted or unsubstituted hetero ring, and $R_4$ and $R_6$ may be linked to each other to form a substituted or unsubstituted hydrocarbon ring or a substituted or unsubstituted hetero ring, and $R_7$ is hydrogen; an alkyl group; a haloalkyl group; or an aryl group unsubstituted or substituted with a halogen group, an alkyl group, an alkoxy group, an aryl group or an alkylaryl group.

According to an exemplary embodiment, $R_1$ to $R_4$ of Chemical Formula 1 are the same as or different from each other, and are each independently hydrogen; a fluorine group; a chlorine group; an alkyl group having 1 to 6 carbon atoms; an alkoxy group having 1 to 6 carbon atoms; a carboxylic acid-substituted alkyl group having 1 to 6 carbon atoms; an aryl group having 6 to 20 carbon atoms unsubstituted or substituted with an alkoxy group having 1 to 6 carbon atoms; —COOR; or a —COOR-substituted alkyl group having 1 to 6 carbon atoms, and herein, R is an alkyl group having 1 to 6 carbon atoms.

According to another exemplary embodiment, $R_1$ to $R_4$ of Chemical Formula 1 are the same as or different from each other, and are each independently hydrogen; a chlorine group; a methyl group; a carboxyl group-substituted ethyl group; a methoxy group; a phenyl group; a methoxy group-substituted phenyl group; or a —COOR-substituted methyl group, and herein, R is an alkyl group having 1 to 6 carbon atoms.

According to an exemplary embodiment, $R_5$ and $R_6$ of Chemical Formula 1 are the same as or different from each other, and are each independently hydrogen; a nitro group; an alkyl group having 1 to 6 carbon atoms; a carboxyl group-substituted alkyl group having 1 to 6 carbon atoms; or —$SO_3Na$.

According to an exemplary embodiment, $R_5$ and $R_6$ of Chemical Formula 1 are the same as or different from each other, and are each independently hydrogen; a nitro group; an ethyl group; a carboxyl group-substituted ethyl group; or —$SO_3Na$.

According to an exemplary embodiment, $R_7$ of Chemical Formula 1 is hydrogen; an alkyl group having 1 to 6 carbon atoms; or an aryl group having 6 to 20 carbon atoms unsubstituted or substituted with an alkyl group having 1 to 6 carbon atoms, an alkoxy group having 1 to 6 carbon atoms, an aryl group having 6 to 20 carbon atoms or an alkylaryl group having 7 to 20 carbon atoms.

According to an exemplary embodiment, $R_7$ of Chemical Formula 1 is hydrogen; methyl; ethyl; propyl; butyl; pentyl; phenyl; methylphenyl; dimethylphenyl; trimethylphenyl; naphthyl; biphenyl-substituted naphthyl; dimethylfluorene-substituted naphthyl; terphenyl-substituted dimethylphenyl; methoxyphenyl; or dimethoxyphenyl.

According to an exemplary embodiment, Chemical Formula 1 may be represented by the following structural formulae.

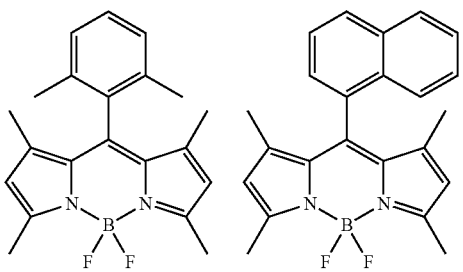
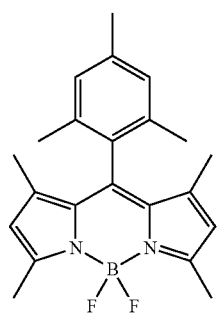
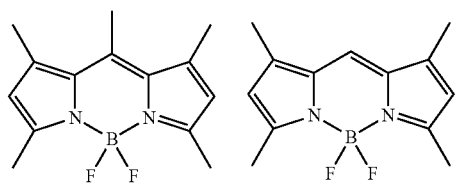
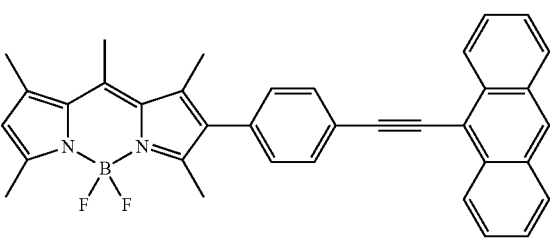
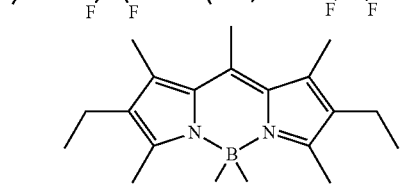
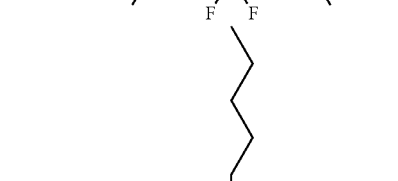
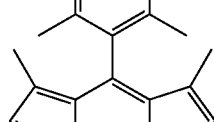
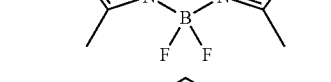
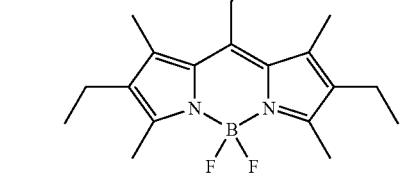
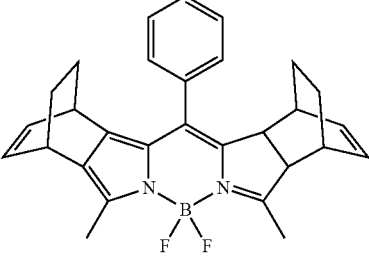

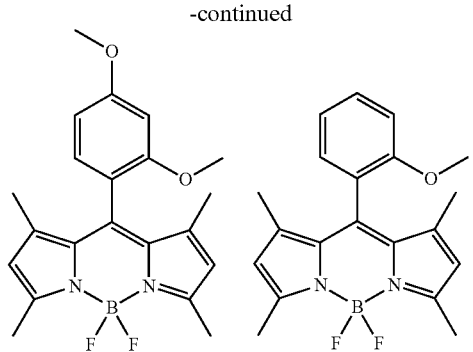
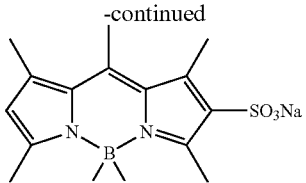
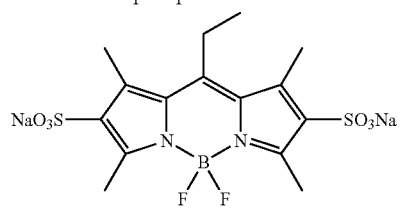
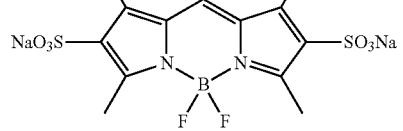
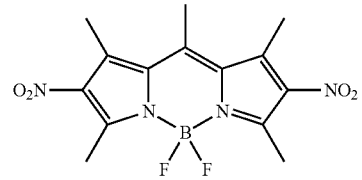
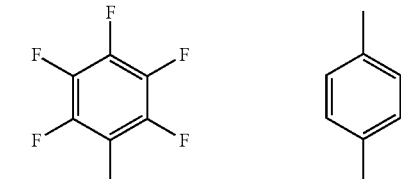
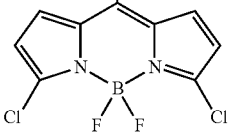
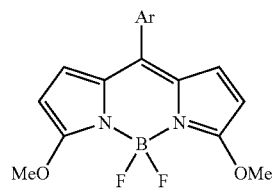
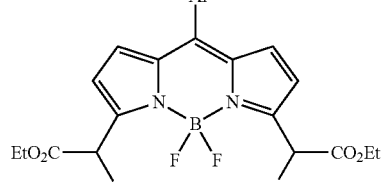
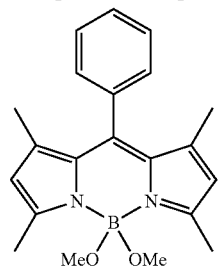
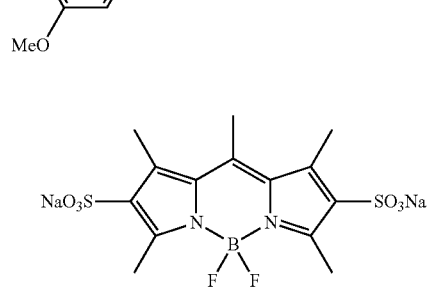

In the structural formulae, Ar is a substituted or unsubstituted aryl group. For example, Ar may be an aryl group substituted with an alkyl group or an alkoxy group.

According to an exemplary embodiment, a compound having the following structural formula may be used. The compound having the following structural formula has a maximum absorption wavelength at 490 nm and a maximum light emission peak at 520 nm in a solution state.

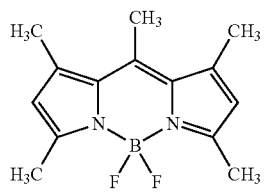

However, the compound is not limited to the above-mentioned structural formula, and various fluorescent substances may be used.

According to another example, a fluorescent substance having a maximum absorption wavelength at 560 nm to 620 nm and a light emission peak at 600 nm to 650 nm in a solution state may be used as the organic fluorescent material. For example, a compound of the following Chemical Formula 2 may be used.

[Chemical Formula 2]

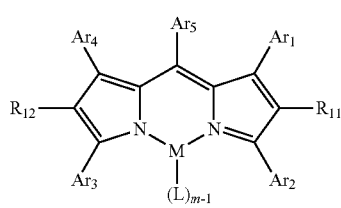

$R_{11}$, $R_{12}$, and L are the same as or different from each other, and are each independently hydrogen; an alkyl group; a cycloalkyl group; an aralkyl group; an alkylaryl group; an alkenyl group; a cycloalkenyl group; an alkynyl group; a hydroxyl group; a mercapto group; an alkoxy group; an alkoxyaryl group; an alkylthio group; an arylether group; an arylthioether group; an aryl group; a haloaryl group; a heterocyclic group; a halogen group; a haloalkyl group; a haloalkenyl group; a haloalkynyl group; a cyano group; an aldehyde group; a carbonyl group; a carboxyl group; an ester group; a carbamoyl group; an amino group; a nitro group; a silyl group; or a siloxanyl group, or may be linked to an adjacent substituent to form a substituted or unsubstituted aromatic or aliphatic hydrocarbon or hetero ring, M is a m-valent metal, and includes boron, beryllium, magnesium, chromium, iron, nickel, copper, zinc or platinum, and, $Ar_1$ to $Ar_5$ are the same as or different from each other, and are each independently hydrogen; an alkyl group; a haloalkyl group; an alkylaryl group; an amine group; an arylalkenyl group unsubstituted or substituted with an alkoxy group; or an aryl group unsubstituted or substituted with a hydroxy group, an alkyl group or an alkoxy group.

According to an exemplary embodiment, Chemical Formula 2 may be represented by the following structural formulae.

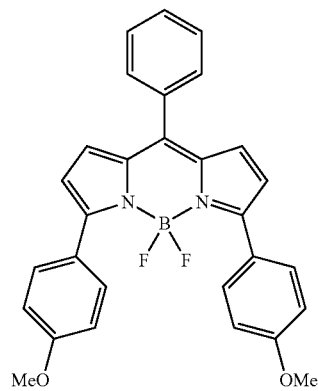

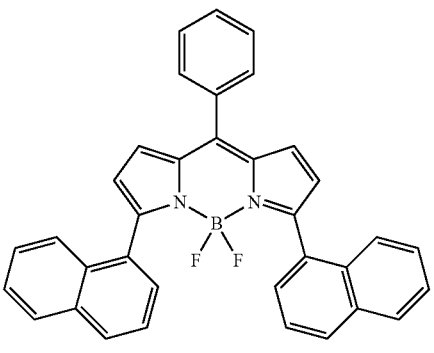

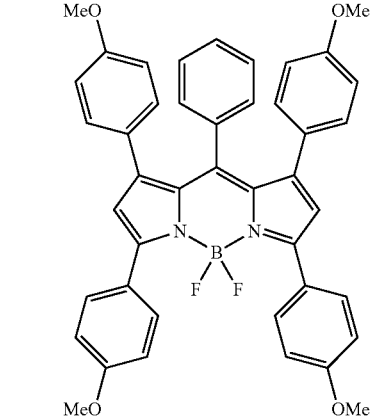

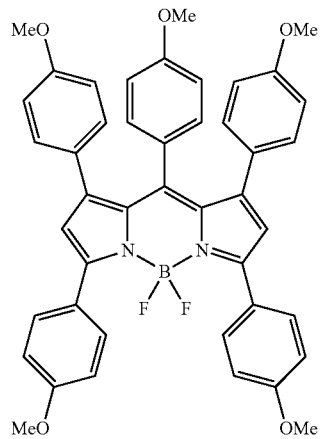

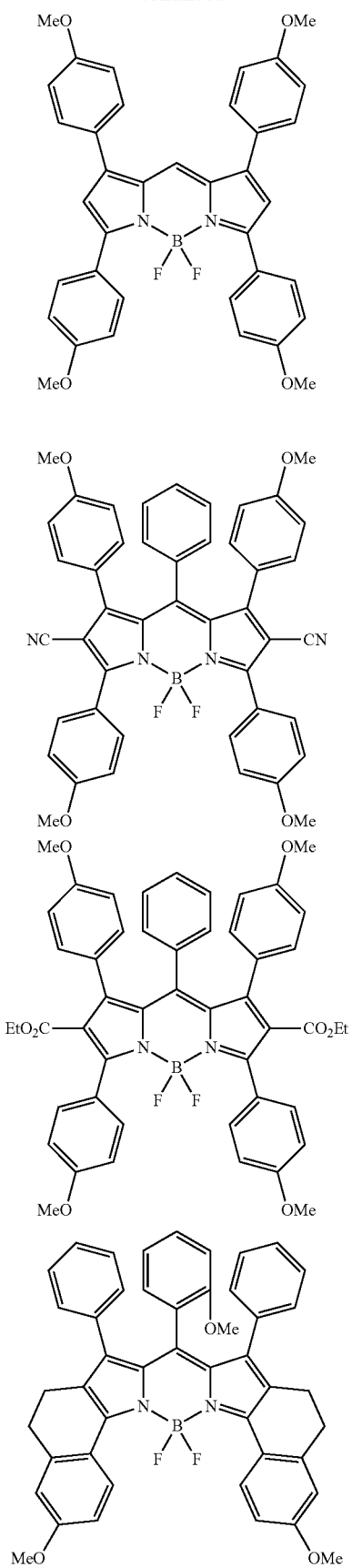
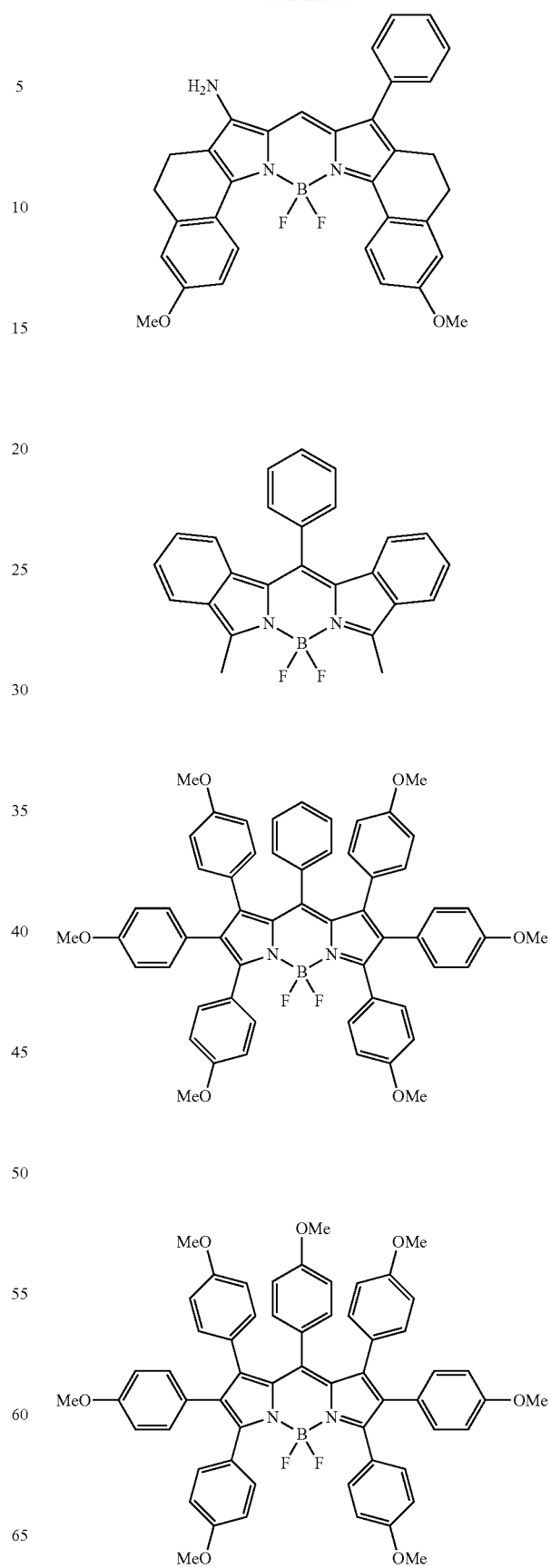

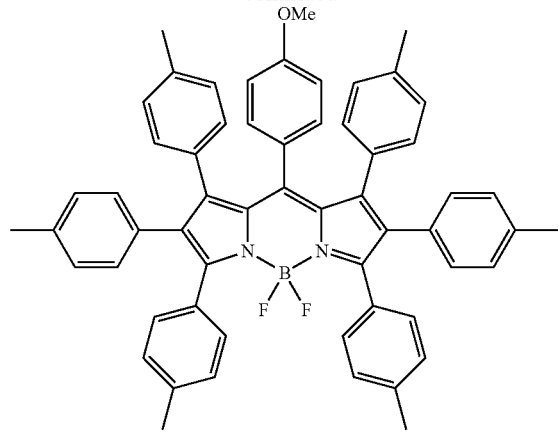

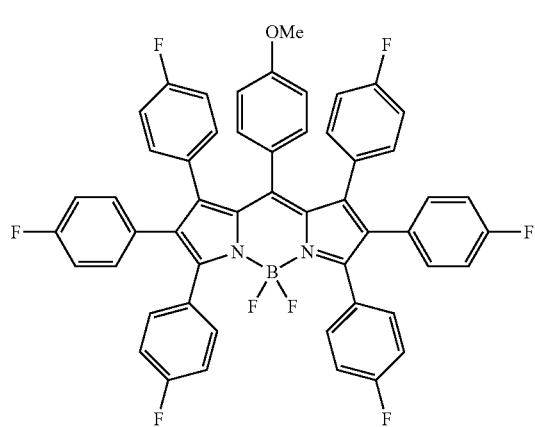

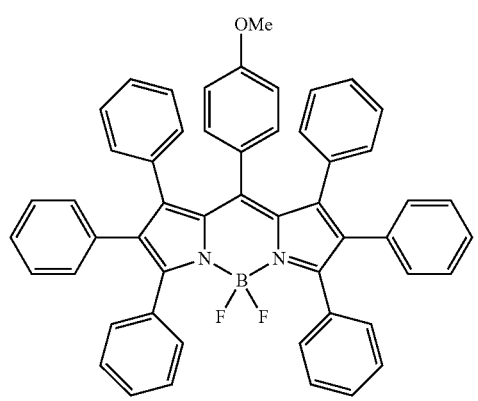

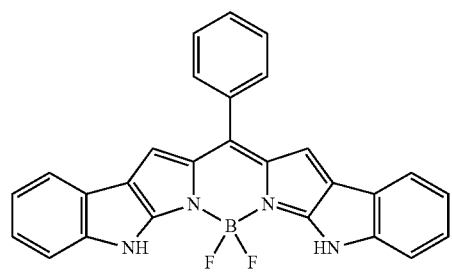

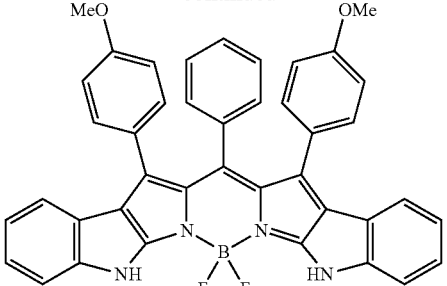

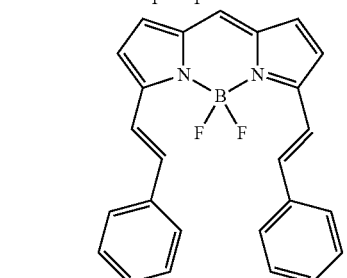

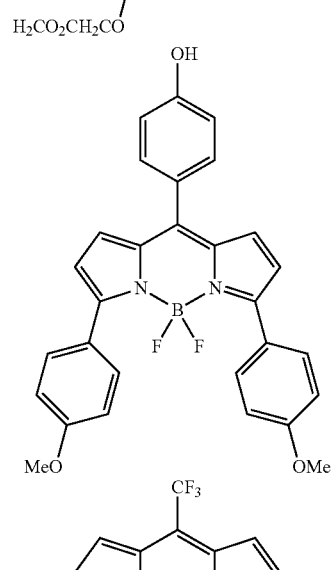

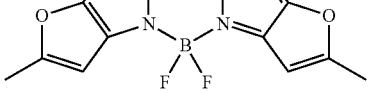

The fluorescent substance illustrated above has a light emission peak's full width at half maximum of 40 nm or less in a solution state, and has a light emission peak's full width at half maximum of approximately 50 nm in a film state.

The content of the organic fluorescent material may be 0.005 parts by weight to 2 parts by weight based on 100 parts by weight of the resin matrix.

It is preferred that a material for the resin matrix is a thermoplastic polymer or a thermosetting polymer. Specifically, as the material for the resin matrix, it is possible to use a poly(meth)acrylic material such as polymethylmethacrylate (PMMA), a polycarbonate (PC)-based material, a polystyrene (PS)-based material, a polyarylene (PAR)-based material, a polyurethane (TPU)-based material, a styrene-acrylonitrile (SAN)-based material, a polyvinylidenefluoride (PVDF)-based material, a modified-polyvinylidene-fluoride (modified-PVDF)-based material, and the like.

The color conversion layer according to the exemplary embodiments described above may have a thickness of 2 µm to 200 µm. In particular, the color conversion layer may exhibit high brightness even with a small thickness of 2 µm to 20 µm. This is because the content of the fluorescent substance molecule included in a unit volume is higher than that of a quantum dot. For example, a 5 µm-thick color conversion film to which a 0.5 wt % content of the organic fluorescent material is applied may show high brightness of 4,000 nit or more based on the brightness of 600 nit of a blue backlight unit (blue BLU).

The color conversion film according to the above-described exemplary embodiments has a substrate provided on one surface thereof. The substrate may function as a support when preparing the color conversion film. This substrate is provided at an opposite surface side of a surface of the color conversion layer facing the adhesive layer. The kind of substrate is not particularly limited, and the material or thickness of the substrate is not limited as long as the substrate is transparent and may function as the support. Here, transparency means that the transmittance of visible light is 70% or more. For example, as the substrate, a PET film may be used. If necessary, the substrate may be replaced with a barrier film.

The color conversion layer may be prepared using a method including: coating a resin solution in which the organic fluorescent material is dissolved on a substrate; and drying the resin solution coated on the substrate, or a method including extruding the organic fluorescent material together with a resin.

Since the above-described organic fluorescent material is dissolved in the resin solution, the organic fluorescent material is uniformly distributed in the solution. This is different from a process of preparing a quantum dot film, which requires a separate dispersing process.

As for the resin solution in which the organic fluorescent material is dissolved, the preparation method is not particularly limited as long as the organic fluorescent material and the resin described above are dissolved in the solution.

According to an example, the resin solution in which the organic fluorescent material is dissolved may be prepared using a method of preparing a first solution by dissolving an organic fluorescent material in a solvent, preparing a second solution by dissolving a resin in a solvent, and mixing the first solution and the second solution. When the first solution and the second solution are mixed, it is preferred to uniformly mix the solutions. However, the method is not limited thereto, and it is possible to use a method of simultaneously adding and dissolving an organic fluorescent material and a resin in a solvent, a method of dissolving an organic fluorescent material in a solvent and subsequently adding and dissolving a resin, a method of dissolving a resin in a solvent and subsequently adding and dissolving an organic fluorescent material, and the like.

The organic fluorescent material included in the solution is the same as described above.

As the resin included in the solution, it is possible to use the above-described resin matrix material, a monomer which is curable by the resin matrix material, or a mixture thereof. Examples of the monomer which is curable by the resin matrix material include a (meth)acrylic monomer, and the monomer may be formed as a resin matrix material by UV curing. When a curable monomer is used as described above, an initiator required for curing may be further added, if necessary.

The solvent is not particularly limited, and is not particularly limited as long as the solvent may be removed by a subsequent drying while not adversely affecting the coating process. As a non-limiting example of the solvent, it is possible to use toluene, xylene, acetone, chloroform, various alcohol-based solvents, methyl ethyl ketone (MEK), methyl isobutyl ketone (MIBK), ethyl acetate (EA), butyl acetate, cyclohexanone, propylene glycol methylethyl acetate (PG-MEA), dioxane, dimethylformamide (DMF), dimethylacetamide (DMAc), dimethylsulfoxide (DMSO), N-methyl-pyrrolidone (NMP), and the like, and one type or a mixture of two or more types may be used. When the first solution and the second solution are used, the solvents included in each of the solutions may also be the same as or different from each other. Even when different solvents are used in the first solution and the second solution, it is preferred that these solvents have compatibility so as to be mixed with each other.

The process of coating the resin solution in which the organic fluorescent material is dissolved on a substrate may use a roll-to-roll process. For example, the process may be performed by a process of unwinding a substrate from a roll on which the substrate is wound, coating the resin solution, in which the organic fluorescent material is dissolved, on one surface of the substrate, drying the resin solution, and then winding the substrate again on the roll. When the roll-to-roll process is used, it is preferred that the viscosity of the resin solution is determined within a range in which the process may be implemented, and the viscosity may be determined within a range of, for example, 200 to 2,000 cps.

As the coating method, various publicly-known methods may be used, and for example, a die coater may also be used, and it is also possible to use various bar-coating methods such as a comma coater and a reverse comma coater.

After the coating, a drying process is performed. The drying process may be performed under conditions required for removing the solvent. For example, a color conversion layer including a fluorescent substance having desired thickness and concentration may be obtained on a substrate by carrying out the drying in an oven located close to a coater under a condition to sufficiently evaporate a solvent, in a direction of the substrate progressing during the coating process.

When the monomer which is curable by the resin matrix material is used as a resin included in the solution, curing, for example, UV curing may be performed before the drying or simultaneously with the drying.

When the organic fluorescent material is filmed by being extruded with a resin, an extrusion method known in the art may be used, and for example, a color conversion layer may be prepared by extruding the organic fluorescent material with a resin such as a polycarbonate (PC)-based resin, a poly(meth)acrylic resin, and a styrene-acrylonitrile (SAN)-based resin.

Subsequently, it is possible to carry out a step of applying an adhesive composition or sheet including a radical polymerizable compound having a weight average molecular weight (MW) of 300 or more on at least one surface of the color conversion layer; and a step of forming an adhesive layer by curing the composition or sheet. In the applying of the composition, various coating methods described in association with the above-described forming of the color conversion layer may be used. As the curing, a UV curing may be used. The curing conditions may be determined according to the component and composition ratio of the composition.

A pressure-sensitive adhesive or adhesive layer may be formed on the color conversion layer prepared as described above. The pressure-sensitive adhesive or adhesive layer may also be formed by applying a composition for forming a pressure-sensitive adhesive or adhesive layer, and then polymerizing or curing the composition, and may also be formed by a method of attaching a pressure-sensitive adhesive or adhesive sheet on the color conversion layer. The pressure-sensitive adhesive or adhesive sheet may also be polymerized or cured after being attached to the color conversion layer, but may also be polymerized or cured before being attached to the color conversion layer, if necessary. Light diffusion particles may be dispersed in the composition for forming a pressure-sensitive adhesive or adhesive layer to disperse the light diffusion particles in a pressure-sensitive adhesive or adhesive layer. In this case, light diffusion particles may also be directly dispersed in a composition for forming a pressure-sensitive adhesive or adhesive layer, and the polydispersity of light diffusion particles may be increased by mixing a dispersion, in which the light diffusion particles are dispersed in a separate solvent, with the composition for forming a pressure-sensitive adhesive or adhesive layer. If necessary, a sonicator or a shaker may be used in order to disperse light diffusion particles in a solvent.

Figure 3:
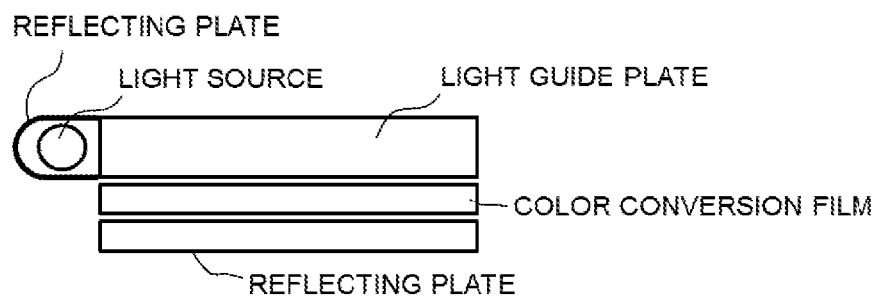
FIGS. 3 and 4 illustrate a schematic view of a backlight unit including a color conversion film according to an exemplary embodiment of the present application.
Figure 4:
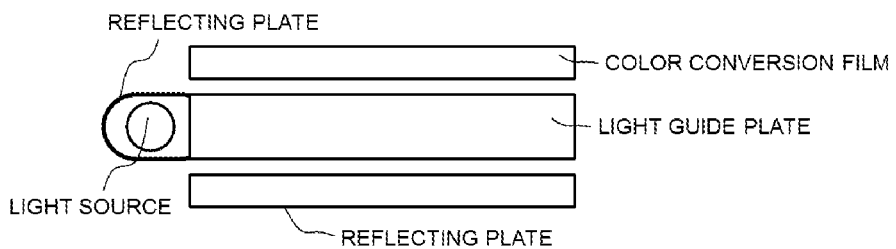

Another exemplary embodiment of the present application provides a backlight unit including the above-described color conversion film. The backlight unit may have a backlight unit configuration known in the art, except that the backlight unit includes the color conversion film. According to an exemplary embodiment, the backlight unit includes a light guide plate, a light source provided so as to irradiate light onto the light guide plate, and a reflecting plate provided at one side of the light guide plate, in which the above-described color conversion film is provided between the light guide plate and the reflecting plate, or on a surface opposite to a surface of the light guide plate facing the reflecting plate. For example, FIGS. 3 and 4 illustrate an example. According to FIG. 3, the color conversion film according to the above-described exemplary embodiments is provided between a light guide plate and a reflecting plate. The pressure-sensitive adhesive or adhesive layer of the color conversion film may also be attached to a light guide plate, or may also be attached to a reflecting plate. According to FIG. 4, the color conversion film according to the above-described exemplary embodiments is provided on a surface opposite to a surface of the light guide plate facing the reflecting plate. The pressure-sensitive adhesive or adhesive layer of the color conversion film may also be attached to a light guide plate, or may also be attached to another film provided on a surface opposite to a surface close to the light guide plate. FIGS. 3 and 4 illustrate a configuration including a light source and a reflecting plate surrounding the light source, but the configuration is not limited to such a structure, and may be modified depending on the structure of the backlight unit known in the art. Further, the light source may use a direct type as well as a side chain type, and a reflecting plate or a reflecting layer may be omitted or replaced with other constituents, if necessary, and an additional film, for example, a light diffusion film, a light collecting film, a brightness enhancement film, and the like may be additionally provided, if necessary.

Figure 5:
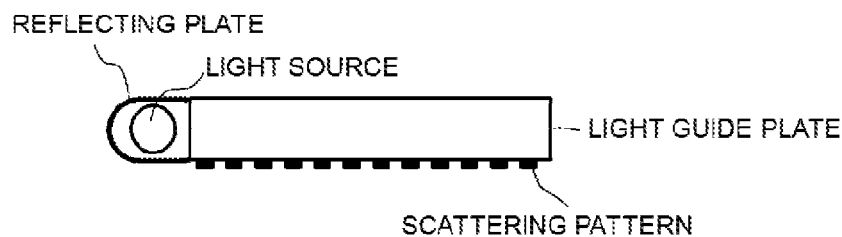
FIGS. 5 and 6 illustrate a scattering pattern provided in a light guide plate of a backlight unit according to exemplary embodiments of the present application.
Figure 6:
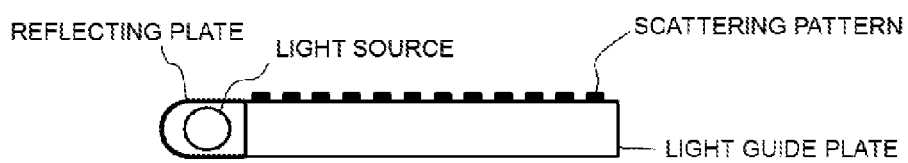

In the configuration of a backlight unit as illustrated in FIGS. 3 and 4, a scattering pattern may be provided on an upper or lower surface of the light guide plate, if necessary. FIG. 5 illustrates an example in which a scattering pattern is provided on a lower surface of the light guide plate, that is, a surface facing the reflecting plate, and FIG. 6 illustrates an example in which a scattering pattern is provided on an upper surface of the light guide plate, that is, a surface opposite to a surface facing the reflecting plate. Light flowing into the light guide plate has a non-uniform light distribution caused by repeated optical processes such as reflection, total reflection, refraction, and penetration, and the scattering pattern may be used for inducing the non-uniform light distribution to uniform luminance.

Figure 7:
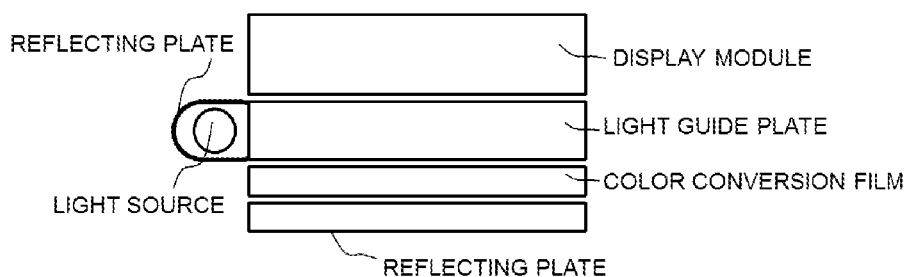
FIGS. 7 and 8 illustrate a display device according to exemplary embodiments of the present application.
Figure 8:
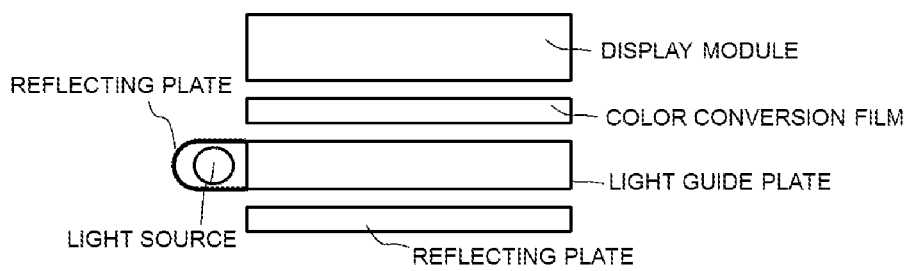

Still another exemplary embodiment of the present application provides a display device including the above-described backlight unit. The display device is not particularly limited as long as the device includes the above-described backlight unit as a constituent element. For example, the display device includes a display module and a backlight unit. FIGS. 7 and 8 illustrate a structure of the display device. However, the structure is not limited thereto, and an additional film, for example, a light diffusion film, a light collecting film, and a brightness enhancement film, and the like may be further provided between the display module and the backlight unit, if necessary.

Hereinafter, the present invention will be described in more detail through Examples. However, the following Examples are provided for exemplifying the present specification, and the scope of the present specification is not limited thereby.

EXAMPLE

An adhesive liquid prior to curing was prepared by adding a curing agent and a promoter to a solution in which 17 wt % of a pressure-sensitive adhesive was dissolved in a methyl ethyl ketone (MEK) solvent. Meanwhile, a $TiO_2$ dispersion with a concentration of about 20 wt % was prepared by dispersing $TiO_2$ (surface-treated $TiO_2$ having a particle diameter of 200 to 300 nm commercially available from Dupont) in dimethylformamide (DMF). The $TiO_2$ dispersion was mixed with the adhesive liquid prior to curing by weighing the $TiO_2$ dispersion such that the $TiO_2$ solid content became about 2 wt % compared to the solid content of the adhesive liquid prior to curing. The mixture was coated on a cover film and thermally cured. The thermally cured product of the adhesive liquid was laminated at a side of a color conversion layer having a structure including a substrate and a color conversion layer (0.15 parts by weight of an organic fluorescent material based on 100 parts by weight of a resin matrix solid content).

Comparative Example

The preparation was carried out in the same manner as in the Example, except that the $TiO_2$ dispersion was not used.

The structures of the color conversion films prepared in the Example and the Comparative Example and the results of measuring the haze (haziness), brightness, and quantum yield (QY) are shown in the following Table 1.

(1) Measurement of Haze

The turbidity of the film was measured using an HM-150 apparatus. In the apparatus, light emitting from a lamp penetrated the sample and was made incident into an integrating sphere. In this case, the light was separated into diffusion light (DT) and parallel light (PT) by the sample, and these lights were reflected in the integrating sphere, and then collected in a light-receiving device. The collected light was transferred to a measuring part, and desired measurement data were output to a display.

(2) Measurement of Brightness and Quantum Yield (QY)

The brightness and quantum yield of the color conversion film prepared were calculated by measuring a brightness spectrum using a spectroradiometer (SR series manufactured by TOPCON Corporation). Specifically, a light guide plate of a backlight unit including a blue LED (a maximum light emission wavelength of 450 nm) and the light guide plate was stacked on one surface of the prepared color conversion film, a prism sheet and a dual brightness enhancement film (DBEF) were stacked on the other surface of the color conversion film, and then the brightness spectrum of the film was measured. An initial value was set, such that the luminance of the blue LED light was 600 nit based on the absence of the color conversion film when the brightness spectrum was measured.

TABLE 1

| | Cover film | Comparative Example PET | Example PET |
|---|---|---|---|
| Structure | Adhesive layer 21.4 μm | $TiO_2$ 0% | $TiO_2$ (1.6 parts by weight of $TiO_2$ solid content based on 100 parts by weight of the adhesive layer except for $TiO_2$) |
| | Color conversion layer (Resin + Organic fluorescent material) | $TiO_2$ 0% | $TiO_2$ 0% |
| | Substrate | PET | PET |
| Haze | Tt (Total light transmittance) (%) | 90.4 | 67.5 |
| | Td (Diffuse transmittance) (%) | 2.1 | 35.2 |
| | H(%) | 2.3 | 52.1 |
| | Brightness | 586 | 623 |
| | Quantum yield (QY) | 0.69 | 0.84 |

As shown in Table 1, the brightness and quantum yield (QY) of the color conversion film (Example) including an adhesive layer including light diffusion particles were enhanced compared to the color conversion film (Comparative Example) not including light diffusion particles.

What is claimed is:

1. A color conversion film comprising:
   a substrate;
   a color conversion layer provided on the substrate; and
   a pressure-sensitive adhesive or adhesive layer provided on the color conversion layer,
   wherein the color conversion layer comprises a resin matrix and an organic fluorescent material dispersed in the resin matrix and the pressure-sensitive adhesive or adhesive layer comprises light diffusion particles dispersed therein,
   wherein the color conversion layer is disposed between the substrate and the pressure-sensitive adhesive or adhesive layer,
   wherein the light diffusion particles include one or more selected from the group consisting of $TiO_2$, $SiO_2$, $Al_2O_3$, hollow $SiO_2$, $ZrO_2$ and $CeO_2$,
   wherein the light diffusion particles have a particle diameter of 200 nm to 5 μm, and
   wherein the content of the light diffusion particles is within a range of 1 to 30 parts by weight based on the total 100 parts by weight of the pressure-sensitive adhesive or adhesive layer.

2. The color conversion film of claim 1, wherein the pressure-sensitive adhesive or adhesive layer comprises a cation polymerizable pressure-sensitive adhesive or adhesive component, a radical curable pressure-sensitive adhesive or adhesive component, or a mixture thereof.

3. The color conversion film of claim 1, further comprising:
   an additional film provided on a surface facing a surface of the pressure-sensitive adhesive or adhesive layer being brought into contact with the color conversion layer.

4. The color conversion film of claim 3, wherein the additional film is a resin film, a protective film, a barrier film, or a release film.

5. The color conversion film of claim 1, wherein the color conversion film has a light emission peak's full width at half maximum of 60 nm or less during irradiation of light including a wavelength of 450 nm, or having a light emission peak at 450 nm, a full width at half maximum of 40 nm or less, and a monomodal light emission strength distribution.

6. A backlight unit comprising the color conversion film of claim 1.

7. A display device comprising the backlight unit of claim 6.

* * * * *